Aug. 24, 1965 R. O. STANLEY 3,202,405
VERTICAL SHAFT KILN AND METHOD OF OPERATION THEREOF
Filed July 18, 1962 4 Sheets-Sheet 1

INVENTOR.
Robert O. Stanley
BY
Scofield, Kokjer, Scofield & Lowe
ATTORNEYS.

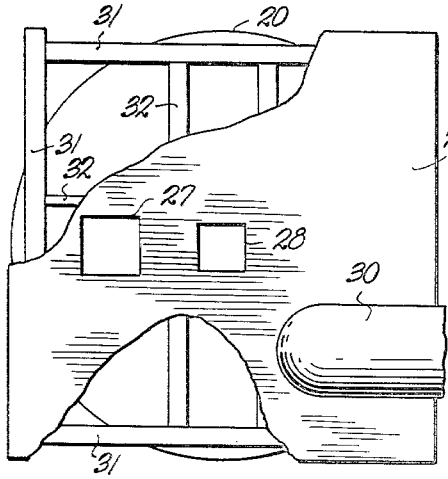
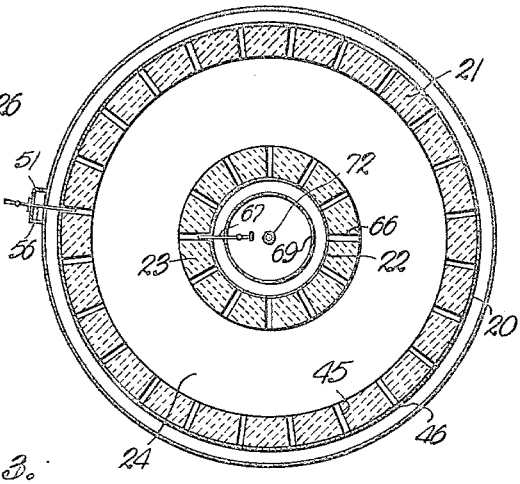
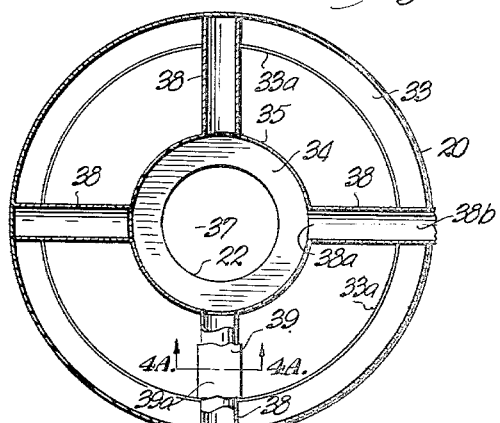
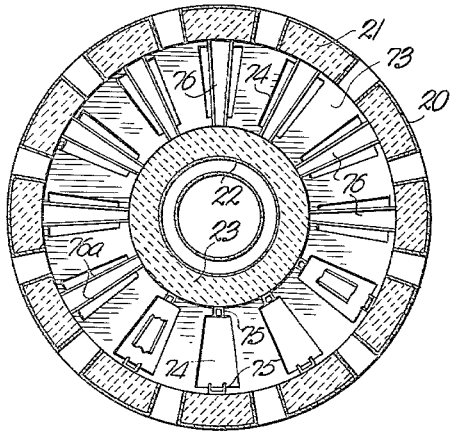
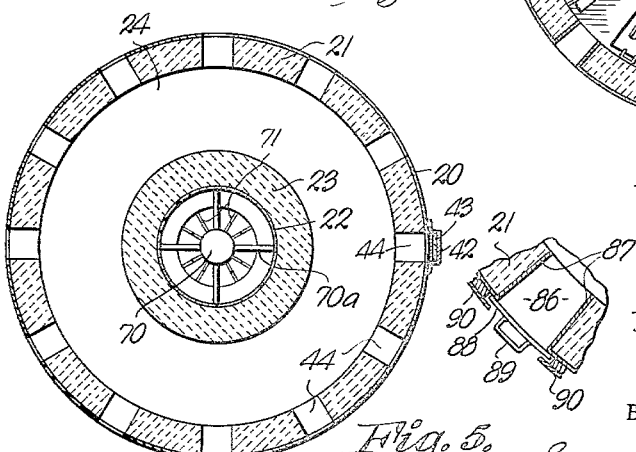
INVENTOR.
Robert O. Stanley

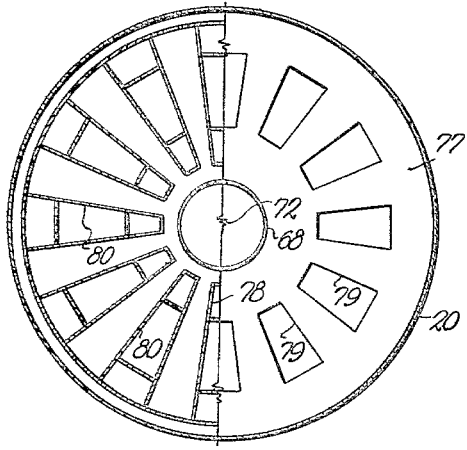
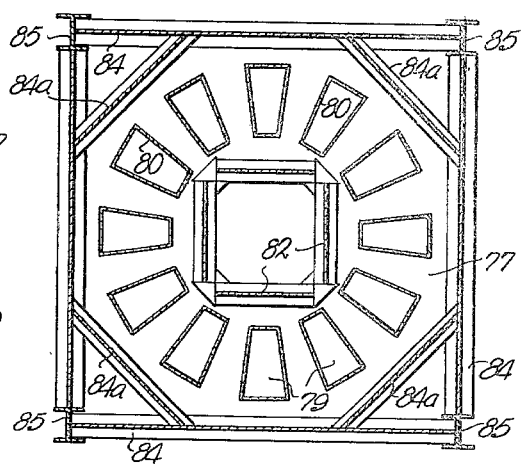
Fig. 8.   Fig. 9.
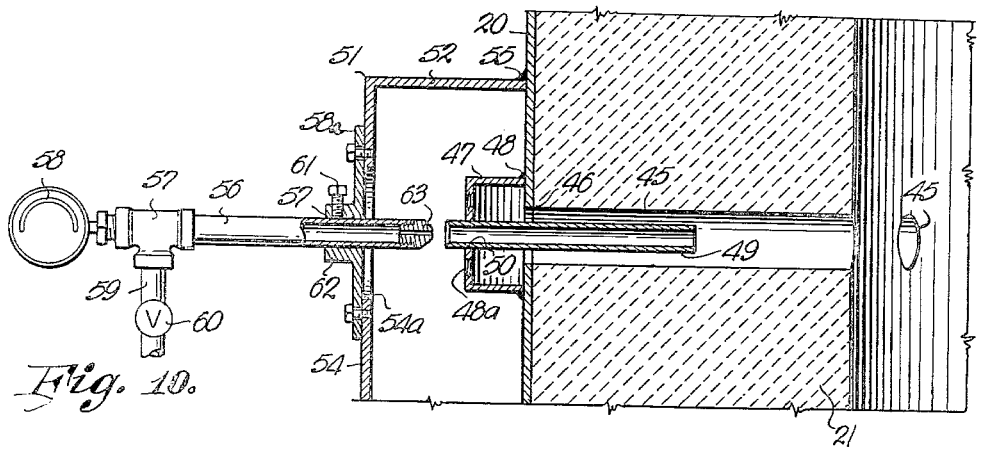
Fig. 10.
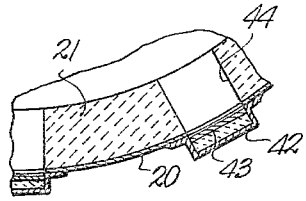
Fig. 5A.
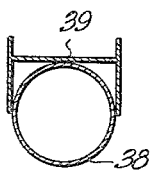
Fig. 4A.
INVENTOR.
Robert O. Stanley
BY
Scofield, Kokjer, Scofield & Lowe
ATTORNEYS.

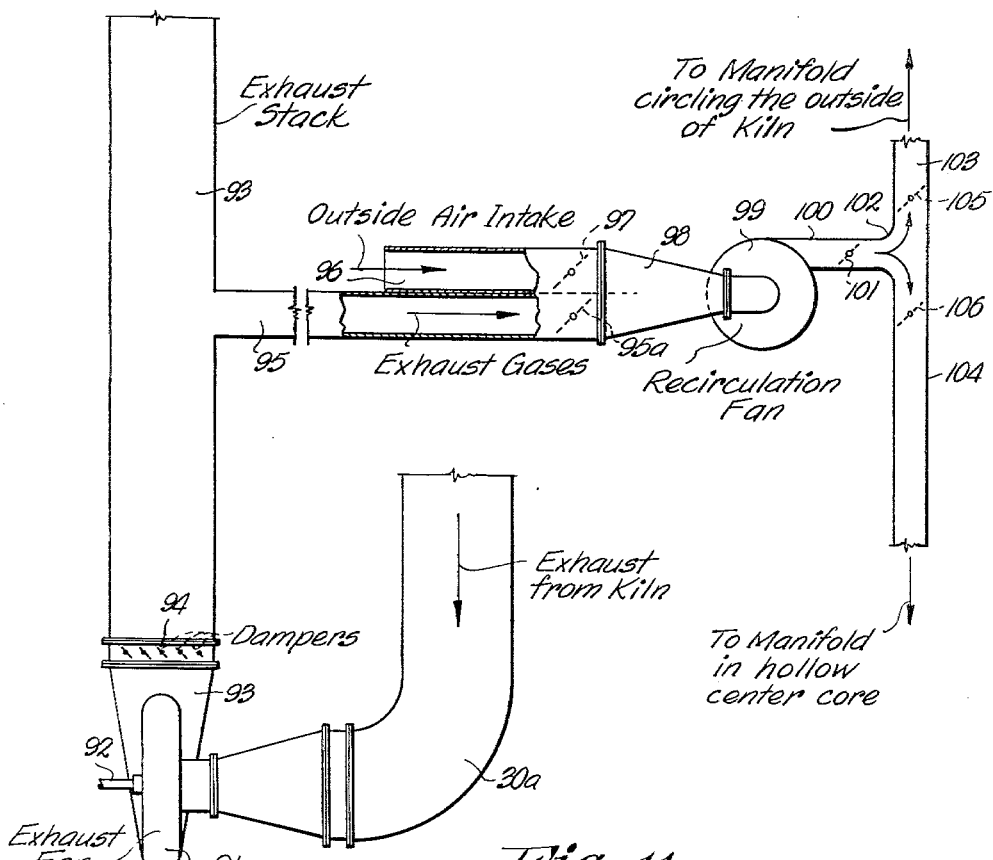

United States Patent Office 3,202,405
Patented Aug. 24, 1965

3,202,405
VERTICAL SHAFT KILN AND METHOD OF OPERATION THEREOF
Robert O. Stanley, Kansas City, Kans., assignor to Midland Lime, Inc., Bonner Springs, Kans., a corporation of Kansas
Filed July 18, 1962, Ser. No. 220,112
10 Claims. (Cl. 263—29)

This invention relates to vertical shaft kilns and refers more particularly to such employed in calcining, roasting or sintering.

An object of the invention is to provide a method of operation and a vertical shaft kiln having a crown or table top so as to equally distribute incoming raw material throughout the annular material passage section.

Another object of the invention is to provide a vertical shaft kiln providing a clean, unobstructed and straight down flow of material to be calcined, roasted or sintered through an annular passageway whereby the material does not break up, thus resulting in markedly less dust and also reducing abrasion on material and refractory linings.

Another object of the invention is to provide a vertical shaft kiln wherein all of the materials treated are equally exposed to the same burning or heating conditions throughout corresponding areas of the kiln and wherein little or no funneling, channeling or flow rate differential of the raw material is permitted.

Another object of the invention is to provide a vertical shaft kiln having multiple burners arranged in such an array as is most suitable to cause uniform calcining, roasting or sintering of the material in all corresponding positions in the kiln.

Another object of the invention is to provide a vertical shaft kiln which employs both recirculated exhaust gases and primary air introduction into the burning zone in order to better adjust the flame or kiln burning.

Another object of the invention is to provide an improved burner construction for a vertical shaft kiln wherein the characteristics of the flame produced by the burner are completely regulatable.

Another object of the invention is to provide a vertical shaft kiln and burner construction cooperating therewith wherein uniform burning or temperature can be maintained in all corresponding positions in the kiln.

Another object of the invention is to provide burner constructions for vertical shaft kilns, said burner constructions cooperating with the kiln structure whereby combustion can be controlled according to particular calcining, roasting or sintering requirements in that the flame may be varied from a hot, concentrated flame blast as in a blowtorch, to a long, slow burning, lazy flame.

Another object of the invention is to provide a vertical shaft kiln having a multiplicity of adjustments available therein whereby to be able to meet any calcining, roasting or sintering requirements for various materials.

Another object of the invention is to provide a center core vertical shaft kiln which permits gas quantity and pressure control and also provides a means to determine the degree of gas fuel penetration out into space voids left between material particles prior to major combustion inception.

Another object of the invention is to provide a center core type vertical shaft kiln design which results in the arrangement of multiple burners directed both inwardly and outwardly into an annular section whereby to reduce the required flame penetration distance.

Another object of the invention is to provide a vertical shaft kiln having a draft control in the exhaust system which aids in control of kiln burning by providing induced air flow conditions controlled as to pressure and flow rate.

Another object of the invention is to provide a vertical shaft kiln which has a hollow center core extending longitudinally a length approximately equal to the sum of the distances of the three temperature zones in the kiln (cooling, burning and preheating) whereby to greatly diminish the possibilities of hot or cold spots developing in the annulus.

Another object of the invention is to provide vertical shaft kilns wherein roasting, calcining or sintering processes are performed with a better temperature control, uniformity and regulation than heretofore has been obtainable by virtue of a hollow center core construction thereof, whereby input of gas fuel, recirculated exhaust gases and primary air may be accomplished in the very heart of the kiln.

Another object of the invention is to provide a vertical shaft kiln having an air cooled center core, with single directional flow therein.

Another object of the invention is to provide a vertical shaft kiln employing gas fuel which is spent or combusted in direct contact with the raw material to be roasted, calcined or sintered.

Another object of the invention is to provide a vertical shaft kiln for large output or large quantity production having a relatively large diameter wherein satisfactory distribution of air over the useful or effective cross section is provided.

Another object of the invention is to provide a vertical shaft kiln for large quantity output and of relatively large diameter wherein uniform burning of the product at all points of the shaft cross section is provided.

Another object of the invention relates to the structure and operation of a vertical shaft kiln for burning cement, lime, dolomite and similar substances, in which a hollow, central, concentrically arranged core extends along the entire length of the kiln shaft.

Another object of the invention is to provide a vertical shaft kiln which operates to provide uniform combustion, calcination, etc. at a high rate of flow therethrough.

Another object of the invention is to provide a vertical shaft kiln which provides a uniform downward flow of material being processed and a uniform upward flow of processing gases throughout the cross section of the kiln.

Another object of the invention is to provide a vertical shaft kiln which consistently produces homogeneous high product quality, said kiln exceedingly economical to construct, operate and maintain.

Another object of the invention is to provide a vertical shaft kiln wherein product is uniformly withdrawn from the bottom of the kiln throughout its cross section.

Another object of the invention is to provide a vertical shaft kiln which effectively operates in such processes as the burning and sintering operations occurring in the manufacture of cements, the decomposition of limestone, dolomite or magnesite and the manufacture of the corresponding oxides, all processes of thermal treatment of granulated, briquetted or pelletized material.

Another object of the invention is to provide a vertical shaft kiln wherein the combustion process and the characteristics of the ultimate product are precisely controlled while a continuous flow of material is treated.

Another object of the invention is to provide a vertical shaft kiln that is relatively economical to operate and to maintain in good running condition, that requires little supervision and in which necessary adjustments can be easily made without excessive difficulty.

Another object of the invention is to provide a vertical shaft kiln which will satisfactorily handle relatively small particles of material, such as, from approximately 1½ inch mesh up to approximately 3 inch mesh, without, however, being restricted to such sizes.

Another object of the invention is the provision of a vertical shaft kiln which reduces heat losses to a minimum.

Another object of the invention is to provide a vertical shaft kiln which cools the calcined or treated material to handling temperatures before discharge.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

FIG. 3 is a top plan of the kiln of FIGS. 1 and 2 showing the exhaust stack takeoff.

FIG. 4 is a view taken along the line 4—4 of FIG. 2 in the direction of the arrows illustrating the exhaust system for the center passages of the kiln.

FIG. 4a is a view taken along the line 4A—4A of FIG. 4 in the direction of the arrows.

FIG. 5 is a view taken along the line 5—5 of FIG. 2 in the direction of the arrows.

FIG. 5a is an enlarged detail of one of the inspection doors of FIG. 5.

FIG. 6 is a view taken along the line 6—6 of FIG. 2 in the direction of the arrows, showing the burner manifold ring.

FIG. 7 is a view taken along the line 7—7 of FIG. 2 in the direction of the arrows.

FIG. 7a is an enlarged detail of one of the access ports in FIG. 7.

FIG. 8 is a view taken along the line 8—8 of FIG. 2 in the direction of the arrows.

FIG. 9 is a view taken along the line 9—9 of FIG. 2 in the direction of the arrows.

FIG. 10 is an enlarged side-sectional view of a burner installation on the outer kiln wall.

FIG. 11 is a schematic diagram of the exhaust and recirculation system for the kiln and burner system, respectively.

FIG. 12 is a schematic view of the flow compensation plate variations permitted relative to the outlet passages.

Structure

Figures 1, 2:
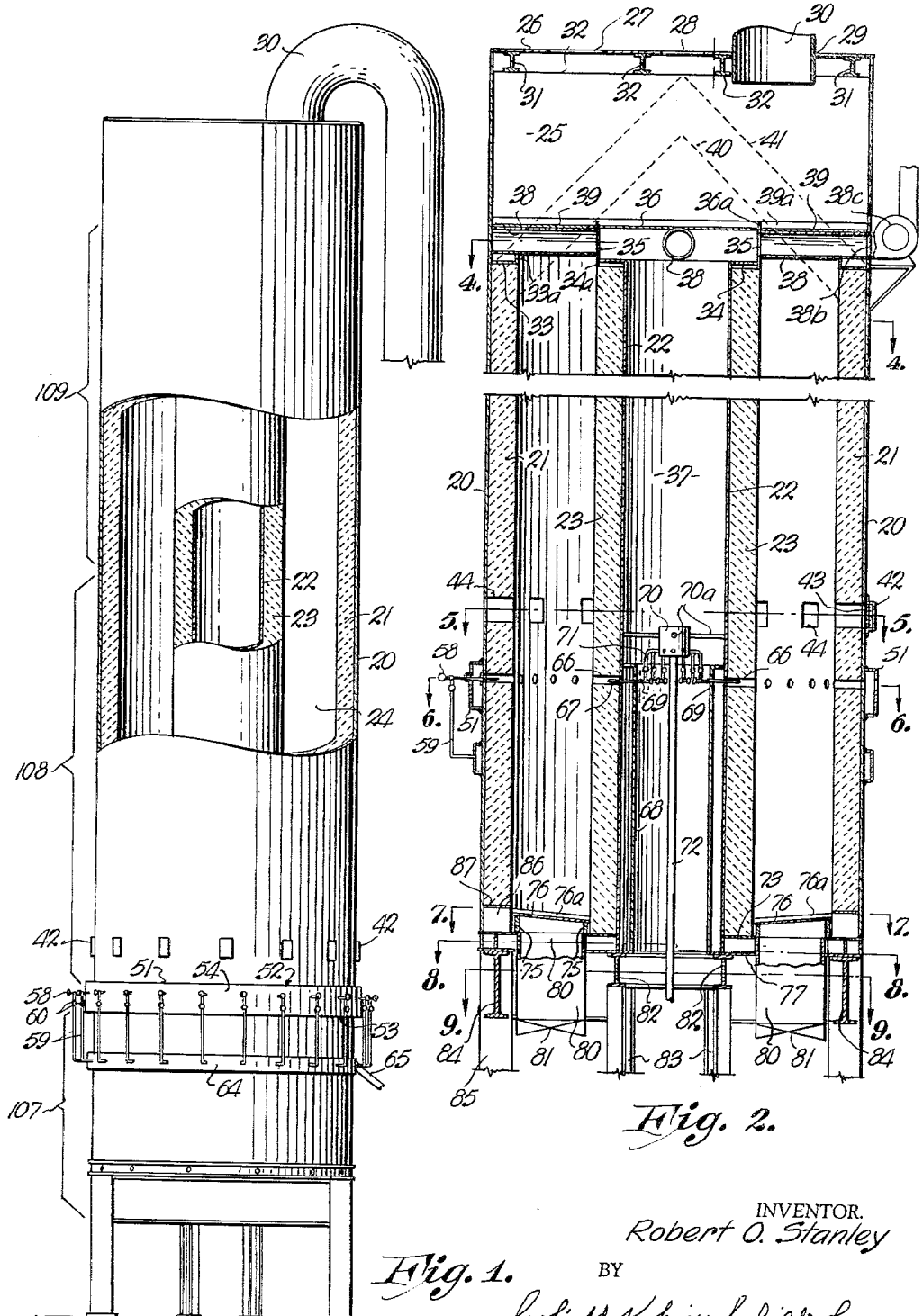
FIG. 1 is a side elevation of a vertical shaft kiln of the subject structure with parts cut away to better illustrate the internal part relationship.
FIG. 2 is an enlarged vertical section through the shaft kiln of FIG. 1, the view broken intermediate the upper and lower ends thereof.

Referring to the drawings, at 20 is designated the outer wall of the subject kiln, preferably metal, and cylindrical in form. Wall 20 has an interior facing 21 of refractory material of conventional type. Concentrically positioned within outer wall 20 is inner wall 22. Wall 22 is preferably of like material to wall 20, and has an exterior facing 23 of conventional type refractory material. The opposed refractory facings 21 and 23 provide and produce therebetween a ring-shaped annulus 24.

Outer wall 20 extends upwardly past the upper terminus of inner wall 22 to provide a material receiving and storage zone there inside generally designated 25. Top cover 26, having material feed port 28 and access inspection port 27 therethrough which may be closed by any suitable conventional cover means (not shown) also has opening 29 in one side thereof operable to receive therethrough exhaust stack 30. Suitable structurals 31 and 32 support cover 26 and stack 30. Structurals 31 are received at their extremities in side wall 20 which supports same.

At the upper end of outer wall 20 angle ring 33 is fixed at its outer edge to the inner surface of wall 20 and has an inner vertically extending flange 33a. At the top of inner wall 22, angle ring 34 is connected at its inner edge thereto and has downwardly extending outer flange 34a. Ring angles 33 and 34 serve to overlie and protect the upper extremities of the refractory walls 21 and 23.

A vertical metal ring flange 35 is carried on and fixed to the outer edges of ring angle 34 and has removable, peripherally vertically flanged (36a) sealing and material receiving cover 36 fitted therewithin. This structure is best seen comparing the upper portion of FIG. 2 and FIG. 4. The hollow center of wall 22 comprises air flow shaft 37 which is exhausted at its upper end by one of four pipes 38. The exhausting pipe of the four is open at each end thereof (38a and b, FIG. 4) and communicates between the volume within ring flange 35 and cover 36 and the air outside outer wall 20. A ventilating fan, 38c, FIG. 2, may be employed to aid in exhaustion of shaft 37. Suitable members 39 having edge flanges 39a (see FIG. 4a) overlie pipes 38 and are fastened at their inner ends to ring 35 and at their outer ends to wall 20. Ring 35 and wall 20 are not perforated where met by the other three pipes 38. Pipes 38 support and hold in place the top of the center column. The flanged pipe covering members 39 and the flanged material receiving cover 36 are provided not for structural purposes, but as raw material retention containers. By receiving and retaining input material to the kiln, they serve to prevent erosion of the pipes 38 and other upper structurals by abrasion of raw material moving therepast and thereover. In this manner, material retained itself provides the protective covering or layer over the metal surfaces. Such retained material does not in any way effect or impede material flow. Additionally, the ring 33 with its flange 33a operates in the same manner, namely, to retain material in the trough provided whereby to avoid abrasion of the metal of member 33 or of the refractory thereunder by the constant downward flow of material through the kiln. This is most clearly seen in FIG. 4.

Dotted lines 40 and 41 indicate the high-low limits of raw material in the zone 25.

Dropping down the kiln structure to drawing line 5—5 (FIG. 2 and FIG. 5) and also noting FIG. 5a, it will be seen that, at this level, inspection doors 42, refractory lined as at 43, are provided, whereby to give access to openings 44 formed through wall 20 and refractory lining 21 whereby to permit inspection of the latter to determine its condition at any desired time. Doors 42 are mounted in any conventional manner such as by hinges with latch locks or, alternatively, sliding doors of conventional types may be provided.

FIGS. 1, 2, 6 and 10 will show the details and arrangements of the burner array. Openings or passages 45 are positioned concentrically spaced through outer refractory layer 21. Corresponding openings 46 are provided in outer wall 20. Each opening 46 is enclosed by a capped pipe 47 welded as at 48 circumferentially to each opening 46 and having internally threaded vent holes 48a in the outer face thereof. Lesser diameter tubing or pipe 49, open at both ends, is fixedly received in opening 50 in pipe cap 47 to extend outside thereof and, at the other end, into the passage 45 in the refractory. A manifold ring generally designated 51 having upper wall 52, lower wall 53 and outer wall 54 is welded as at 55 to the outer surface of wall 20. Manifold 51 is fed by means to be later described.

A burner is associated with each pipe 49 and passage 45 and typically comprises a pipe 56 having T-fittings 57 threaded on the outer end thereof. T-fitting 57 carries a conventional gas pressure gauge 58 in one leg and input gas means 59 such as a flexible copper pipe having valve 60 thereon on the other. Tubing or pipe 56 is received in opening 57 in plate 58a, the latter fastened by bolts 59a to outside face 54 of manifold 51. Face 54 has opening 54a therein closed by plate 58a. Set screw 61, threaded in ring fitting 62 connected to or integral with plate 58a, fixes pipe 56 in opening 57 and permits the inward or outward movement thereof relative to the fixed end of pipe 49. Any suitable nozzle 63 may be removably inserted or threaded into the inward end of pipe 56. Gas feed tubing 59 draws gas from a manifold 64 preferably mounted on the outside surface of wall 20 and also preferably positioned below manifold 51. Gas is input to manifold 64 from any suitable source such as line 65.

Referring particularly to FIGS. 2 and 6, it may be seen that a plurality of passages 66 are formed through inner refractory wall 23 communicating with openings 67 through inner wall 22. An elongate hollow ring manifold 68 is fixed to the inside surface of wall 22 and has a plurality of openings 69 therein. Openings 67 mount capped pipe and tubing assemblies of exactly the same structure as that shown in FIG. 10. Likewise, openings 69 mount burner constructions precisely the same as shown in the left portion of FIG. 10. These being identical in every detail, they will not be redescribed in detail or shown. Thus, for example, the showing of FIG. 10 could as well be a burner firing outwardly into annulus 24 as inwardly thereinto. The burners positioned in openings 69 are fed from a common manifold 70 supported in shaft 37 by any suitable means such as a spider connected to the inner wall 22 with tubings 71 each leading to an individual burner. Manifold 70 is fed by gas line 72 which, itself, may be made rigid enough to support the manifold 70 in the shaft 37, if desired. Recycle inner manifold 68 is fed in the same manner as outer recycle manifold 51, to be described.

As is perhaps best seen in FIGS. 2 and 7, the lower end of annular space 24 is closed off by ring plate 73 which has a plurality of circumferentially spaced openings or passages 74 therethrough. Ring plate 73 also underlies the two refractory walls 21 and 23 and, additionally, outer wall 20 to which it is welded or otherwise fixedly attached. The inner edge of ring plate 73 is welded or otherwise fixedly attached to the outer surface of inner wall 22. Paired vertically oriented angles 75 are provided at the inner and outer extremities of openings 74 whereby to mount thereon even material flow compensation plates 76. Plates 76 are slightly inwardly canted and tapered as is seen in the views. Plates 76 are so sized relative to the size of equal spaced openings 74 that the angle of repose of material thereon clears the edges of openings 74. Plates 76 also have edge flanges 76a thereon to capture raw material and provide a natural cone wear surface.

Basic support ring plate 77 is mounted under ring plate 73 and underlies both manifold 68 and inner wall 22, which are fixed to the upper surface thereof. Plate 77 is spaced vertically downwardly from plate 73 by vertically extending wedge supports 78. Supports 78 underlie and are fixed to ring plates 73 on their upper edges and overlie and are fixed to the upper face of ring plate 77 at their lower edges. Openings 79 are provided through ring plate 77 whereby to permit the passage of chutes 80 therethrough which are a continuation of openings 74 in ring plate 73. Chutes or hoppers 80 have any suitable sort of dump valves, clam shell doors, or the like 81 at a level substantially below the level of plate 77. Plate 77 is supported centrally by box I-beams 82 supported by suitable posts 83. The peripheral portions of plate 77 are supported by outer box I-beams 84 engaged between vertical beams 85 and braced by beams 84a.

Access ways are provided below the level of compensation plates 76 as particularly seen in FIG. 7a. Passages 86 through refractory 21 are provided with walls 87 supported by ring plate 73. Sliding door 88 (vertically slidable) having handle 89 is received in slideways 90 fixed to the outer wall 20. Such permit reach access into material compensation plate 76 over openings 74 whereby to permit clearance of jams, cleaning, and the like.

Referring to FIG. 11, therein is shown the recirculation gas flow plan and mixing air intake. Stack gases which pass out of the top of the kiln through exhaust stack 30 pass downwardly as seen in FIG. 1 and thence into a right-angle turn section 30a. The latter connects to exhaust fan 91 of conventional type. Exhaust fan 91, driven by shaft 92, discharges into rising secondary exhaust stack 93, this flow controlled by a bank of dampers 94. From thence the exhaust gases pass upwardly in stack 93. Connecting intermediate the length of stack 93, draw-off pipe 95 has outside air intake pipe 96 mounted parallel thereto, flow through the latter controlled by damper 97. Pipe 95 and pipe 96 feed into common channel 98, drawn by conventional type recirculation fan 99. Discharge from fan 99 is through flow passage 100 controlled by damper 101 into T-junction 102 having arms 103 and 104. Flow in arms 103 and 104 is controlled by dampers 105 and 106, respectively. Arm 103 leads to manifold 51 circling the outside of the kiln, while flow line 104 leads to manifold 68 on the inside surface of wall 22 by any suitable line and connection.

*Operation*

Referring to FIG. 1, it may be seen that there are some three operating zones of the vertical kiln herein described. A cooling zone 107 runs from below burner input openings 45 and 66 down to, roughly, clam shell valves 81 on the discharge chutes. A calcining, sintering or burning zone 108 extends roughly half the height of annulus 24 from above openings 45 and 66. A preheating zone 109 extends the additional vertical length of annulus 24.

I have created a kiln construction operative to provide a most uniform and controlled process in all respects for calcining, roasting or sintering. As shown, the kiln is optionally of cylindrical form utilizing an inner hollow center air circulating shaft, core or chamber defined by an inner wall having an external surface refractory facing. This facing 23 is opposed by a concentric like facing whereby to provide therebetween an annular chamber for the passage of materials to be calcined, roasted or sintered. Center shaft or chamber 37 is cooled by fan induced outside air introduced through an opening in the bottom of the shaft and discharged or wasted out through one of the pipes 38 communicating interiorly with the central upper exhaust chamber under plate 36. In operation of the kiln, the discharged air which is used as a coolant through shaft 37 is heated approximately 100° F. above its introduced atmospheric temperature thereby creating similar corresponding wall temperatures throughout the entire kiln. In other words, corresponding wall temperatures are approximately the same on exterior kiln wall as those of interior air chamber wall at the center core.

The crown or table top plate 36 operates to equally distribute incoming raw material throughout the annular material passage section 24. Thus, as material to be treated is fed in through, say, opening 28, it builds to a cone on the top of plate 36 whereby to feed evenly thereafter into the annulus 24. With a kiln design providing a clean, unobstructed, straight down flow of material to be calcined, roasted or sintered, through annulus 24, the feed material breaks up very little, thereby resulting in little dust. Also, considerably less abrasion is caused to material and refractory linings.

Even material flow compensation plates 76 positioned directly above draw-off openings 74, same of equal size and spacing, are of considerable usefulness in providing uniform or good calcining, roasting or sintering of the raw feed material. For such successful process practice, it is absolutely necessary for all of the feed material to be equally exposed to the same burning or heating conditions throughout corresponding areas of the kiln. Little or no funneling, channeling or flow differential of the raw material can be tolerated because over-burning, under-burning, or both will result in the finished product. Previously, several methods have been used by others to prevent such funneling. In the first place, some have provided draw-off openings directly under the burning zone of the same approximate area proportions. However, this limits production to a very small operation. Secondly, others have provided load supporting parallel rails or bars and a discharge spout in the bottom of or off to the side of the kiln in a reduced area proportion relative to the burning area. Material is then hand raked out from between the rails in a manner to create an even flow of material through the kiln. Here, again, the objection is that production is limited to a small output. Finally, others have provided mechanically operated grates over the entire kiln bottom area. This is generally good, but usually excessively expensive and such grates also create maintenance problems. If the latter two disadvantages are not overwhelming, such grates could be applied in the instant kiln.

However, in the kiln illustrated and described, even material flow compensation plates 76 are placed relative to equal spaced size openings 74 so as to take precise advantage of the angle of repose or standing angle of the desired material in the kiln. I have discovered that the angle of repose in any calcined instance to be between 50° and 55°. A calcined, roasted or sintered material which is smooth and round would have a flatter angle of repose than if the material was rough and pointed. In such a case, I employ an even material flow compensation plate half the area size of the corresponding draw-off opening in exact confinement of the angle of repose. This plate is suspended in the kiln in such manner as to form a support directly over a draw-off opening positioned so that the projected angle of material repose extends down from the plate in line with the side edges of the draw-off opening edges. Thus, by material load support and by diversion of the material flow just above the discharge openings (with the said compensation plates positioned as described) I obtain an even and uniform material flow of all the feed material in the critical portions or zones of the kiln.

FIG. 12 conveys the idea as to size and location of the flow compensation plates. These plates can be any size which is smaller than the corresponding discharge opening, provided the size and height of same conform to the exact confines of the natural angle of repose of material. I arbitrarily chose compensation plates half the discharge opening size, and positioned same in exact confines of angle of repose. I could have used another size just as well. As a matter of precaution, compensation plates 76 should not be located so close to discharge openings 74 as to choke the flow therethrough, which will happen if the material to be discharged is larger than the gap or opening left between compensation plate and discharge opening.

I employ individually adjustable, multiple burners in a particular critically advantageous array and using a gaseous fuel (such as natural gas, propane, water or manufactured gas) in the manner most suitable to cause uniform calcining, roasting or sintering of material in all corresponding positions in the kiln.

Calcining, roasting or sintering in the instant kiln is particularly effected by the following material variables: (1) size and composition uniformity; (2) temperature requirements; and (3) heat exposure time requirements.

(1) With respect to the former, the feed material, whether in the form of rock, ore, briquettes, pellets or nodules, should be of an approximate uniform size so that heat exposure and penetration requirements are substantially the same for all the material. In the instant kiln, combustion takes place in the same chamber with material to be calcined, roasted or sintered. If said material is not of an approximate uniform gradation, the void areas created between the material particles are reduced accordingly, thus limiting combustion and the upward and lateral passage of heated gases. Smaller, uniform size materials require less time to calcine, roast or sinter because particle heat penetration requirements are less. However, in this respect, material should not be so fine or small as to prevent establishment of a uniform current or draft through all the material in the kiln. Utilizing limestone rock, a gradation of from 6 to 8 inch size normally is used in most lime kilns. I operate my kiln using a limestone rock gradation in this range or, alternatively, I can operate down in the gradation range of 1½ to 3 inches. With careful control, I can go as far down as ¾ to 1 inch gradation. This is also true with respect to ores and other pelletized materials.

(2) With respect to the second point, temperature requirements, whether rock, ore, pellets, nodules, briquettes or whatever form the material may be, or whether it is to be calcined, roasted or sintered, each material has its own particular temperature burning gradient. Thus, in a lime operation, for example, the most suitable temperature for calcining (a term meaning the driving off of carbonates to make an oxide with heat) takes place between 2000° F. and 2100° F. Most lime plants presumably operate in the neighborhood of 2300° F. with occasional higher temperature operations. In a cement operation, where raw cement meal is made into nodules, pellets or briquettes, the raw material needs to be sintered. (Sintering means a fusion with heat of various compounds to form complex calcium silicate compounds in addition to driving off carbonates, at temperatures around 2700° F.) *Thus, it is critically necessary to be able to uniformly regulate the temperature gradient in the kiln and in my kiln precise regulation is possible.*

As in all the modern vertical kilns, combustion or burning takes place in the space voids in and around the material to be calcined, roasted or sintered. The gas in the instant kiln is introduced into the burning zone 108 under pressure (typically 22 to 24 pounds) through a small orifice in each of the burner nozzles. Little premixing of gaseous fuel and oxygen takes place until the gas, because of burner design, penetrates or flows out into the kiln and around the material. Most of the oxygen required to support combustion comes from what I designate as "secondary air." Such secondary air is introduced into the bottom of the kiln through the draw-off or discharge gates 81. The passage of the air through the discharging material operates to preheat it in cooling zone 107 and thereby also cooling the calcined lime or product ready for discharge. Mixture of the gaseous fuel and preheated air takes place as they circulate around the feed material in burning zone 108. Preheated air to support combustion makes for an efficient burning operation and fuel economy, but it can create excessively damaging burning temperatures. For example, utilizing natural gas in atmospheric air, a flame temperature of 3000° F. can be created but with 1000° F. preheated air, a 4000° F. flame temperature is possible. Additionally, a hot flame is a short, concentrated flame which effectively narrows the burning zone length of the kiln.

About twenty years ago, a process was developed involving introducing recirculated exhaust gases back into the burning zone of the kiln in order to cool and extend the flame length. Additionally, for some time, others have introduced solely atmospheric air back into the burning zone of the kiln in order to cool the burning zone. Such recycle or recirculated air or exhaust gas is referred to as "primary air" because it is the first to come in contact with the gaseous fuel. Vertical kilns heretofore employing introduction of recirculated exhaust gases or atmospheric air did so through a duct or ducts with apertures constructed in a refractory-made internal wall with constricting material flow features resulting. In cases of primary air introduction, some kilns employ separate ducts, others a gas and air combination duct and still others employ both introduction methods mentioned above. Separate ducts have also been employed for recirculated exhaust gas introduction.

To my knowledge, no other kiln than the one here illustrated, employs both recirculated exhaust gas *and* primary air introduction into the burning zone in order to better adjust the flame or kiln burning. To do this, I provide for two converging ducts 95 and 96, the former one connected to the discharge side of the kiln exhaust stack 93 in order to obtain the exhaust gases for recirculation, the latter, 96, having an open end operative to draw in outside air. Both pipes or ducts are connected to the suction or intake of blower fan 99. Both above-mentioned ducts are preferably fitted with control dampers (97 and 95a) and conventional pressure and flow measuring devices. Conventional pressure and flow measuring devices are preferably installed in the intake (95 and 96) and discharge ducts (103 and 104) of the recirculation system in locations thought to have the least turbulence. In other words, the longest, straightest, least obstructed, most uniform portions or sections of the particular duct should be chosen. These enable the precise regulation of the relative quantities of primary air and recirculated exhaust gas to be introduced. Following blower fan 99 discharge in lead off 100, I install another damper 101 whereby to control the total mixed gas output. Discharge duct 101 splits into two ducts, 103 and 104, the latter connected to the manifold 51 circling the outside of the kiln shell at burner height, the former, 104, connecting up to manifold 68 placed in the hollow center column, shaft or core 37. Both manifolds 51 and 68 have pressure measuring devices that equal pressure can be maintained by adjusting dampers 105 and 106 in their respective connecting ducts. In both manifolds, several equally spaced all around manometer cocks preferably are installed for measuring pressure and flows.

It is thus seen that three gaseous components are passed in through gas blast pipes 49 and their opposite analogues in openings 45 and 66: (a) primary air drawn in pipe 96, (b) recirculated exhaust gases from pipe 95 and (c) fuel drawn from the manifold 64 through the tubings 59 or fuel drawn from manifold 70 through tubings 71. These three mixed gases emerge from passages 45 and 66 into annulus 24. Primary air flow and exhaust gas recycle are metered also through openings 48a in pipes 47 as well as being venturied into free ends of pipes 49. Openings 48 are preferably concentrically placed around pipes 49 in pipe caps 47 and plugged or opened as desired. The size of the opening into the free end of pipe 49 may be varied by sliding tubings 56 in or out relative thereto, controlled by set screw 61.

By virtue of the various above-described controls, uniform burning and temperatures can be maintained in all corresponding positions of the kiln. Also, the type of combustion can be controlled according to particular calcining, roasting or sintering requirements of particular raw materials in that the flame may be varied from a hot, concentrated one of a blowtorch effect, to a long, slow burning, lazy flame.

In the start or beginning of an operation, laboratory prognosis helps one to predict the requirements for calcining, roasting or sintering of a particular material. However, in final analysis, the required proper burning conditions are determined by trial and error methods because of the different characteristics found in each kind of raw feed material. However, with the above listed multiple adjustments, a uniform, steady combustion can be produced to fit any calcining, roasting or sintering material burning requirements. Thus, this design makes for gas quantity and pressure control and also provides a means to determine the degree of gas fuel penetration out into the space voids left between the material particles prior to major combustion inception (with raw material filled up to a level approximately ten feet above the burners, by observation through the top of the kiln of flame penetration up through material). Also, the kiln design containing a hollow center core results in an arrangement of like multiple burners directed both inwardly and outwardly into the annular section, thus greatly reducing the required gas fuel penetration distance.

Gaseous fuel is introduced in an unspent state into the kiln through like multiple apertures preferably equally spaced in the perimeters of both the outside and inside walls of the kiln annular material feed section 24. Adjustable but constant gas flow and pressure is maintained in gas fuel manifolds 64 and 70 by means of gas automatic regulating valve in main gas supply line (not shown) prior to its division into subsupply lines 65 and 72. Gas is then equally metered into each burner by virtue of valves 60 and the orifice size regulation in nozzle 63.

Another adjustment to aid or control the kiln burning is the draft control system comprising dampers 94 installed in the exhaust system. This provides precise induced air condition control as to kiln pressure and flow. Also, the draft control governs the quantity of secondary air required for, first, cooling of calcined, roasted or sintered material and, secondly, required combustion. (By controlling the quantity of exhaust gases, the quantity of secondary air introduced through discharge gates required for both combustion and material cooling is likewise regulated.)

In a mass material burning operation as found in the vertical kiln it is a fundamental characteristic or axiom that one gets what is called or known as hot or cold spots therein. If a hot spot develops, a surplus of gas fuel and air to support combustion is drawn to the hot spot, thereby accentuating the condition. In the case of a cold spot, the reverse action takes place. Even in those combustion situations where one uses a solid fuel in a mixture or in conjunction with the raw material, air rushes to a hot spot and starves cold spots, resulting in improper calcining, roasting or sintering of the raw material. However, with a hollow center core kiln, the same extending longitudinally a length approximately equal to the sum of the distances of the three critical zones in the kiln (cooling, burning or preheating) the possibility of hot and cold spots developing is greatly diminished. The reason the hollow center column or core helps to alleviate such in the burning zone of the kiln is because burning and oxidizing gases are drawn to any hot spot via the shortest possible distance. The presence of the center column creates a flow obstruction which forms a detour or additional resistance whereby to help eliminate short circuiting of the said gases and create more uniform temperature throughout corresponding positions in the kiln.

(3) The third material variable effecting calcining, roasting or sintering comprises heat exposure or time requirements. The material rate of flow through any kiln is established by the rate of draw-off of the cooked, finished product. The use of equally spaced draw-offs of equal quantities at the same successive time interval operates to produce a uniform material flow throughout the kiln. To illustrate this, for example, I may operate my kiln with one 600 pound batch draw-off every six minutes from one of the consecutively numbered draw-off gates (12) in the following order: 1-8-3-10-5-12-7-2-9-4-11-6. The input of raw materials may be automatically controlled by a high-low material level control and switch associated therewith. The level control senses the level of material and, for example, actuates or turns off a feed conveyor.

In any kiln of given volume and height, it is necessary by calculation and trial and error to establish a material flow through the kiln at a rate which provides a sufficient heat or temperature exposure of the raw material whereby to consummate the particular calcining, roasting or sintering requirements. In the most recently built kilns, draw-offs are made at frequent intervals or continuously, whereby to tend to eliminate material "hang-ups" in the kilns. However, in such kilns, the burning and burning zones are designed with sufficient length or capacity to provide ample material heat or temperature exposure to complete degree of heat penetration requirements of material to be calcined, roasted or sintered. In older type lime kilns, calcined product was drawn off at intervals of heat or temperature material exposure durations, such taking usually two or more hours. With each draw-off, because of material "hang-ups," it was necessary to dislodge or poke the material down with bars through fire doors. This is called, in the trade, "trimming." In the old type vertical kilns of low production, manual adjustments were used, such as poking down a hot spot and letting a cold spot or area remain during trimming operations in lieu of or to compensate for lack of uniformity provisions in new high production type vertical kilns such as that shown here.

From the foregoing it will be seen that this invention is one well adapted to attain all of the ends and objects hereinabove set forth together with other advantages which are obvious and which are inherent to the process.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A vertical shaft kiln comprising, in combination, an elongate upright outer wall, an elongate upright inner wall concentrically placed within the outer wall and extending substantially the length thereof whereby to provide a uniform width annulus therebetween, a refractory lining on the outer surface of the inner wall and the inner surface of the outer wall, said inner wall having a top closure thereabove, a bottom air access inlet means to the space enclosed thereby and a top exhaust means therefrom below said top closure whereby to permit cooling of same by air circulation therewithin, a plurality of burners concentrically arranged in the inner and outer walls whereby to discharge into a burning zone in said annulus therebetween, the burners on the inner and outer walls positioned at substantially the same height, means at the base of said annulus to discharge treated materials therefrom, and means at the top of said annulus to collect and discharge combustion gases therefrom.

2. Apparatus as in claim 1 wherein the annulus base discharge means includes a floor in said annulus, a plurality of concentrically arranged slots in the floor of said annulus, and a material flow compensation plate mounted over each slot said plates positioned at such a level above said slots and of such a width relative thereto that the angle of repose of the material being processed extended from the side edges of the plate intersects the floor of the annulus adjacent the edges of the slots.

3. Apparatus as in claim 2 wherein said plates cant inwardly.

4. Apparatus as in claim 1 wherein means for introducing primary air and recirculated exhaust gases are provided into the burning zone in said annulus said means comprising a manifold for the outer wall burners on said outer wall, a manifold for the inner wall burners inside said inner wall, means for collecting the exhaust gases from the upper portion of said kiln annulus and means for mixing a portion of said exhaust gases with outside air and means for separately passing said mixture of outside air and exhaust gases to said two manifolds.

5. Apparatus as in claim 1 including a manifold for the outer wall burners on the said outer wall, a manifold for the inner wall burners inside said inner wall, means for collecting a portion of the exhaust gases from said kiln and mixing same with outside air and means for passing said mixture to said two manifolds.

6. Apparatus as in claim 1 wherein said burners each comprise a primary gas carrying tube discharging into a secondary tube spaced therefrom in concentric venturi fashion whereby to entrain gases surrounding said tube, said secondary tubes surrounded by a manifold and means for feeding a mixture of exhaust gases from said kiln and outside air to said manifold to be entrained with the burner tube flow into said secondary tube.

7. Apparatus as in claim 6 including secondary manifold gas entrainment means comprising manifold gas entraining pipe means tapped at the outer ends thereof into said manifold surrounding each said secondary tube and discharging at the inner ends thereof into a passage around said secondary tube leading into said kiln.

8. Apparatus as in claim 4 including means for regulating relative quantities of exhaust gases and outside air mixed together and passed to said manifolds.

9. Apparatus as in claim 1 wherein the top closure of said inner wall comprises a horizontal table member connected to and across the top of said inner wall, said table member operative to completely block off the space enclosed by the inner wall and receive a conical pile of material to be processed on the upper surface thereof.

10. A process of heat treating materials comprising establishing a vertical downwardly descending column of said material to be treated in the annulus of a hollow center kiln, said column ring-shaped in horizontal section, charging fresh material at the top of said column, passing same downwardly in said column, and removing heat treated material at the bottom thereof, providing a source of fresh combustion gases, flowing said gases into said ring-shaped column at a plurality of concentrically spaced positions above the lower end thereof at both the inner and outer surfaces of said ring, positioning said gas flow lengthwise of said column intermediate the height thereof, positioning said gas flow sufficiently far below the top of said column that material fed thereinto is first preliminary preheated in the uppermost portion of said column and then fully heat treated in the zone immediately above and opposite said gas flows, positioning said gas flow sufficiently far above the bottom of said column that a cooling zone is provided therebelow, preheating, heat treating and cooling said material in said column as same is passed downwardly therein with respect to said gas flows, removing the products of combustion from said column at the upper end thereof, collecting a portion of said removed combustion products, mixing same with the outside air in controlled quantity and recycling the same into the column in concert with the combustion gases newly input thereto in controlled flow between the said concentrically placed gas flow positions.

References Cited by the Examiner

UNITED STATES PATENTS

| | | | |
|---|---|---|---|
| 116,558 | 7/71 | Cochrane | 263—29 X |
| 196,056 | 10/77 | Taylor | 263—29 X |
| 459,799 | 9/91 | Valentine | 263—29 |
| 843,776 | 2/07 | Taylor | 214—18 |
| 1,152,050 | 8/15 | Roitzheim | 263—29 |
| 1,798,802 | 3/31 | Niles | 263—29 |
| 2,451,024 | 10/48 | Ellerbeck | 263—29 |
| 2,687,879 | 8/54 | Heilgenstaedt. | |
| 2,933,297 | 4/60 | Erasmus et al. | 263—30 |
| 3,033,545 | 5/62 | Azbe | 263—29 |

FOREIGN PATENTS 115,232   4/19   Great Britain.

CHARLES SUKALO, Primary Examiner.

JOHN J. CAMBY, Examiner.